United States Patent [19]

Narducy et al.

[11] Patent Number: 4,857,072
[45] Date of Patent: Aug. 15, 1989

[54] HYDROPHILIC COLORED CONTACT LENSES

[75] Inventors: Kenneth W. Narducy, Cupertino, Calif.; Richard L. Jahnke, Villa Park; Samuel Loshaek, Chicago, both of Ill.

[73] Assignee: Schering Corporation, Kenilworth, N.J.

[21] Appl. No.: 124,724

[22] Filed: Nov. 24, 1987

[51] Int. Cl.$^4$ ............................................... D06P 3/52
[52] U.S. Cl. .............................................. 8/507; 8/509; 8/552; 8/557; 8/602; 8/637.1; 8/661; 351/162
[58] Field of Search ............... 8/507, 552, 557, 602, 8/637; 351/162

[56] References Cited

U.S. PATENT DOCUMENTS

| | | | |
|---|---|---|---|
| 2,884,336 | 4/1959 | Loshaek et al. | 117/11 |
| 2,884,340 | 4/1959 | Loshaek | 117/76 |
| 3,557,261 | 1/1971 | Wichterle | 264/1 |
| 3,679,504 | 7/1972 | Wichterle | 156/62 |
| 3,786,034 | 1/1974 | Blair et al. | 260/77.5 |
| 3,987,220 | 10/1976 | Bridge Ford | 427/322 |
| 4,158,089 | 6/1979 | Loshaek et al. | 526/264 |
| 4,182,802 | 1/1980 | Loshaek et al. | 526/264 |
| 4,252,421 | 2/1981 | Foley | 351/162 |
| 4,359,558 | 11/1982 | Gould et al. | 525/454 |
| 4,468,229 | 8/1984 | Su | 8/507 |
| 4,558,931 | 12/1985 | Fuhrman | 361/160 H |
| 4,582,402 | 4/1986 | Knapp | 351/162 |
| 4,638,025 | 1/1987 | Fuhrman | 524/40 |
| 4,668,240 | 5/1987 | Loshaek | 8/507 |
| 4,704,017 | 11/1987 | Knapp | 351/177 |
| 4,720,188 | 1/1988 | Knapp | 351/177 |

FOREIGN PATENT DOCUMENTS

| | | |
|---|---|---|
| 0106004 | 4/1984 | European Pat. Off. . |
| 1176030 | 8/1964 | Fed. Rep. of Germany . |
| 1395501 | 6/1972 | United Kingdom . |

*Primary Examiner*—Paul Lieberman
*Assistant Examiner*—John F. McNally
*Attorney, Agent, or Firm*—Warrick E. Lee, Jr.

[57] ABSTRACT

There is disclosed a method for making colored hydrophilic contact lenses. A contact lens constructed of hydrophilic polymer that is substantially devoid of the functional groups —COOH, —OH, —NH—R, wherein R is hydrogen or $C_1$ to $C_8$ alkyl, —NCO and epoxy is provided. At least a portion of the surface of the lens is coated with a color coat comprising at least one pigment, binding polymer having functional groups selected from at least one of —COOH, —OH, and —NH—R, wherein R is hydrogen or $C_1$ to $C_8$ alkyl, and an additional compound having at least two groups per molecule of —NCO. The coated lens is subjected to conditions which cause the color coat to adhere to the lens.

26 Claims, No Drawings

HYDROPHILIC COLORED CONTACT LENSES

The present invention relates to hydrophilic colored contact lenses.

U.S. Pat. No. 4,668,240 (Loshaek) discloses colored contact lenses produced with a lens polymer that must, in its preferred embodiments, contain one or more of the functional groups —COOH, —OH, or —NH—R, wherein R is hydrogen or $C_1$ to $C_8$ alkyl. At least a portion of the surface of the lens is coated with a color coat comprising at least one pigment, binding polymer having, in the preferred embodiment, the same functional groups, and an additional compound having at least two groups per molecule selected from at least one of —NCO and epoxy. The lens and binding polymers are then bound to each other by the reaction of the groups —COOH, —OH, or —NH—R in the lens and binding polymers with the groups —NCO or epoxy. In another embodiment of the Loshaek patent, the lens polymer contains one or more of the functional groups —NCO or epoxy and the binding polymer contains one or more of the functional groups —COOH, —OH, or —NH—R. The lens and binding polymer are bound to each other by reaction of the functional groups.

However, some hydrophilic contact lenses do not contain one or more of the functional groups —COOH, —OH, —NH—R, —NCO, or epoxy. Typical of such lenses are those disclosed in U.S. Pat. Nos. 4,158,089 (June 12, 1979) and 4,182,802 (Jan. 8, 1980). The lenses disclosed in the latter patents are produced by polymerizing hydrophilic monomers (typically N-vinyl pyrrolidone) and hydrophobic monomers (typically alkyl esters of acrylic or methacrylic acid or styrene). The result is a hydrophilic lens that does not contain the functional groups —COOH, —OH, —NH—R, —NCO, or epoxy.

This invention is predicated on the surprising discovery that a color coat described in Loshaek's U.S. Pat. No. 4,668,240 forms an excellent bond with hydrophilic lenses that do not contain significant amounts of (i.e. are substantially devoid of) the functional groups —COOH, —OH, —NH—R, wherein R is hydrogen or $C_1$ to $C_8$ alkyl, —NCO, and epoxy. With this invention it is possible to color coat lenses made of polymers that are known to produce very high water contents upon hydration, such as N-vinyl-2-pyrrolidone, yet lack the aforementioned functional groups. When this invention is practiced, the advantages of the colored hydrophilic lenses in accordance with the Loshaek patent are retained. That is, the lenses may be prepared with or without an optical prescription for correcting visual defects. The lenses may contain an opaque color coat which can bring about a fundamental color change in the apparent color of the wearer's iris, for example from dark brown to light blue. Alternatively, the color coat may be transparent, in which case the apparent eye tint may be enhanced or the apparent color of light-colored eyes may be changed, for example, from light blue to green. Not only is it possible to choose from opaque or transparent color coats, but it is also possible to color selected portions of the lens. Moreover it is possible to color the lens in a pattern that simulates the fine structure of the iris, using more than one color if that is desirable. Alternatively, it is possible to deposit an opaque pattern over the iris portion of the lens in a manner that can change the apparent color of the iris, but allows visualization of the structure of the iris, as described in U.S. Pat. No. 4,582,402 (Knapp). The lenses are quite durable and retain their color upon prolonged use, even though subjected to the usual disinfecting and cleaning procedures. The pigment used in the color coat need not be reactive.

SUMMARY OF THE INVENTION

The present invention comprises a method for making a colored hydrophilic contact lens comprising the steps of:

(a) providing a contact lens constructed of hydrophilic polymer that is substantially devoid of the functional groups —COOH, —OH, —NH—R wherein R is hydrogen or $C_1$ to $C_8$ alkyl, —NCO, and epoxy, (b) coating at least a portion of a surface of the lens with a color coat comprising at least one pigment, binding polymer having functional groups selected from at least one of —COOH, —OH, and —NH—R, wherein R is hydrogen or $C_1$ to $C_8$ alkyl, and an additional compound having at least two groups per molecule of —NCO, and (c) subjecting the coated lens to conditions which cause the color coat to adhere to the lens.

A second aspect of the invention comprises hydrophilic colored contact lenses made by the inventive method.

DETAILED DESCRIPTION OF THE INVENTION

Contact lenses colored by this invention are made of hydrophilic polymer that is substantially devoid of the functional groups —COOH, —OH, —NH—R, wherein R is hydrogen or $C_1$ to $C_8$ alkyl, —NCO, and epoxy. Typical polymers of this type are produced by copolymerizing a hydrophilic vinyl heterocyclic monomer, such as N-vinyl pyrrolidone, N-vinyl succinimide, N-vinyl-ε-caprolactam, vinyl pyridine, or N-vinyl glutarimide and a hydrophobic monomer such as styrene or $C_1$ to $C_8$ alkyl esters of acrylic or methacrylic acid, e.g. methyl methacrylate, ethyl methacrylate, methyl acrylate, etc. The lens polymer is typically cross-linked with a cross-linking agent such as diallylitaconate, allylmethacrylate, or ethylene glycol dimethacrylate. Typical hydrophilic lenses devoid of the groups —OH, —COOH, and —NH—R, —NCO and epoxy are described in U.S. Pat. Nos. 4,158,089 (Loshaek), 4,182,802 (Loshaek), and British Patent No. 1,395,501 (National Research Development Corp.).

Lenses colored by this invention are preferably formed from monomers comprising N-vinyl pyrrolidone. The amount of N-vinyl pyrrolidone in the lens is preferably from about 50 to about 90 weight percent, more preferably from about 60 to about 80 weight percent and most preferably from about 65 to about 75 weight percent.

Producing the lens by polymerization and shaping is well known in the art and is not a part of this invention. Any of the well known techniques may be used, for example those described in U.S. Pat. Nos. 4,158,089 and 4,182,802.

The color coat that is coated onto the lens comprises at least one pigment, binding polymer having functional groups selected from at least one of —COOH, —OH, and —NH—R, wherein R is as defined previously, and an additional compound having at least two groups per molecule of —NCO.

The term polymer means a material formed by polymerizing one or more monomers or a blend of such polymers. The functional groups of the binding polymer project from the polymer backbone or from another group that projects from the polymer backbone. For example, polymerized hydroxyethyl methacrylate (with the repeating monomer unit shown in brackets) may be represented by:

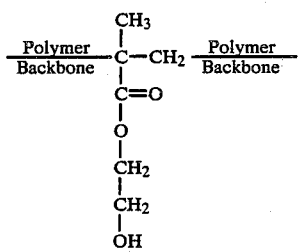

The hydroxyl functional group in this example is at the bottom of this representation.

Examples of suitable monomers that may be used for providing the functional groups in the binding polymers include but are not limited to acrylic acid; methacrylic acid; hydroxy $C_1$ to $C_6$ alkyl esters of acrylic and methacrylic acid, such as hydroxyethyl methacrylate, hydroxypropyl methacrylate, hydroxybutyl methacrylate and hydroxyethyl acrylate; amino $C_1$ to $C_6$ alkylesters of acrylic and methacrylic acid, such as aminoethyl methacrylate, aminoctyl methacrylate, N-methyl aminoethyl methacrylate, N-hexylaminoethyl methacrylate, and aminopentyl acrylate; glyceryl esters of acrylic and methacrylic acid, such as glyceryl mono methacrylate, glyceryl mono acrylate, and combinations thereof. Of course commercially prepared polymers with suitable functional groups may also be used as the binding polymer, e.g. Gantrez resin made by GAF Corporation, which is a methyl vinyl ether-maleic anhydride copolymer, which, on hydrolysis, provides —COOH groups.

In addition to the above required functional groups, the binding polymer may also contain copolymerized monomers not having the functional groups, for example, N-vinyl heterocyclic monomers, such as N-vinyl-2-pyrrolidone; $C_1$ to $C_6$ vinyl ethers, such as vinyl ethyl ether; $C_1$ to $C_6$ alkyl ester of acrylic or methacrylic acid, such as methyl methacrylate and propyl acrylate; $C_1$ to $C_6$ alkyl styrene, such as t-butyl styrene; vinyl monomers such as vinyl chloride and vinyl acetate; diene monomers, such as isoprene; and $C_1$ to $C_6$ alkoxy $C_1$ to $C_6$ alkyl esters of acrylic or methacrylic acid, such as ethoxyethyl methacrylate or methoxypropyl acrylate.

A preferred monomer for making the binding polymer is hydroxyethyl methacrylate.

More preferred binding polymers contain 75 to 100 weight percent hydroxy straight-or-branched chain $C_2$ $C_4$ alkyl monoester of acrylic or methacrylic acid (preferably hydroxyethyl methacryate), 0 to 20 percent $C_2$–$C_4$ alkoxy $C_2$–$C_4$ alkyl ester of acrylic or methacrylic acid (preferably, e.g. ethoxyethyl methacrylate) and 0 to 4 percent acrylic or methacrylic acid (preferably methacrylic acid).

To produce lenses in accordance with the invention, at least a portion of the surface of the lens is coated with a color coat comprising at least one pigment, binding polymer which has the functional groups, and an additional compound having at least two groups per molecule of —NCO (preferably two —NCO groups). Suitable additional compounds include hexamethylene diisocyanate (OCN-$(CH_2)_6$—NCO), 2,4-toluene diisocyanate, and bis(isocyanato phenyl) methane.

Either the front or rear surface or both may be coated. The coated lens is then subjected to conditions which cure the color coat. If the pigment is opaque, then only the portion of the lens corresponding to the iris is usually coated, leaving the pupil section clear. For lenses that are larger in diameter than the iris, the portion of the lens extending beyond the iris may be left uncoated.

The most preferred method of carrying out the coating step is with a mixture comprising pigment, binding polymer, isocyanate compound, and a solvent, which is coated onto the lens surface or a portion thereof. Of course other coating methods are believed operable, e.g. first coating the lens with a mixture of isocyanate compound and a solvent and in turn, coating the first coating with a mixture of binding polymer, pigment and solvent, or first coating the lens with a mixture of binding polymer, pigment and solvent and coating this first coating with a mixture of the isocyanate compound and solvent.

The binding polymer is preferably prepared by polymerizing monomer in solution so it can be used directly for coating formulations without need of dissolving the polymer. In addition, solution polymerization as carried out herein, preferably in combination with a molecular weight modifier, produces polymer of controllable molecular weight and viscosity. However, binding polymers prepared in other ways such as bulk or suspension or emulsion polymerization can also be used provided they can be dissolved in solvents used to prepare the coatings of the invention and otherwise provide the proper physical and rheological properties to the coating. To prepare binding polymer in solution, a solvent or combination of solvents for the monomers and polymers which are formed, a molecular weight modifier and a polymerization initiator are placed in a stirred and heated reaction vessel and heated for a period sufficient to achieve a satisfactory amount of polymerization; usually some residual unreacted monomer remains. The control of molecular weight and amount of cross-linking, if any, helps to maintain a usable solution viscosity during the polymerization and provides a polymeric binder with the proper rheological properties for application of the coating to the lens.

The molecular weight modifiers of the binding polymer, if used, are chain transfer agents well known in the art. Examples of some suitable chain transfer agents include 2-mercapto ethanol, 1-dodecyl mercaptan and other alkyl mercaptans. The amount and type of solvent used in the solution polymerization also influences molecular weight. Increasing solvent and modifier amount causes molecular weight to decrease.

Suitable polymerization initiators include free radical initiators such as 2,2-azobis(isobutyronitrile), benzoyl peroxide, t-butyl peroxybenzoate, and t-butyl peroxide. Ultra violet polymerization may also be used. The exact method of polymerizing the binding polymer is not critical.

In making the color coats of the invention, it is convenient to combine the polymeric binder in solution with the other ingredients. Such other ingredients usually include additional solvent or combinations of solvents which may be the same or different than that used in the solution polymerization.

Suitable solvents include ethyl cellosolve, cyclohexanone, cyclopentanone, ethanol, t-butanol, acetone and other aliphatic and cyclic ketones. A combination of solvents may be used. Ethyl lactate is a good co-solvent and under some circumstances water may be used as a co-solvent. Monomers, such as those used to make the binding polymer, e.g. hydroxyethyl methacrylate and ethoxyethyl methacrylate, may be added and these act as a solvent and may also polymerize. The preferred solvent for solution polymerization is cyclopentanone and for making the color coat it is a combination of cyclopentanone, ethyl lactate, and monomers. The binding polymer solution and pigment are milled to form a colorant paste.

If the binding polymer, pigment and isocyanate compound are to be applied in one step, the colorant paste, isocyanate compound and optional additional monomers are blended to form an ink, paint, or other applyable color coat which is coated onto the lens. If the applyable color coat is to be stored for long periods of time, it should be prepared without the isocyanate compound, which can be blended with the applyable material just prior to its being coated onto the lens. If solvents containing reactive functional groups, e.g. —OH groups of alcohols, are present in the coating, the isocyanate may be excessively consumed by said groups and not be available for reaction with the functional groups of the binding polymer. Thus, with such coatings, it is preferred that the isocyanate compound be added just prior to application. Usually, the solvents evaporate rapidly after the material is applied to the lens so their functional groups are not available to consume isocyanate after application. The useful life of the applyable color coat depends upon the reactivity of the isocyanate compound with the functional groups of the binding polymer and functional groups (if any) in the solvent and the temperature of the material. The life of the applyable coating can be extended by cooling. The suitability of any solvent system and related procedures can readily be determined by examining the quality of the final product.

The choice of pigments is quite flexible, since they need not necessarily contain functional groups. The pigments may be any coloring substance or combination thereof that provides a desired color. Preferred pigments include (C.I. is the color index no.) for a blue color, phthalocyanine blue (pigment blue 15, C.I. 74160), cobalt blue (pigment blue 36, C.I. 77343); for a green color, phthalocyanine green (Pigment green 7, C.I. 74260) and chromium sesquioxide; for yellow, red, brown and black colors, various iron oxides; for violet, carbazole violet. Of course, blends of such coloring substances are used to achieve the desired shade. To produce an opaque coating, titanium dioxide is a preferred opaquing agent. Opaquing agents, which are considered to be pigment within the present specification and claims, are blended with the other pigments into the colorant paste.

Hexamethylene diisocyanate (OCN—$(CH_2)_6$—NCO) is the preferred additional compound. However, use of any isocyanate having the formula $R^1(NCO)_n$ wherein n is greater than or equal to two, (preferably two) is within the scope of this invention. $R^1$ may be a di- or greater valent organic radical such as aliphatic, alicyclic, aliphatic-alicyclic, aromatic, or aliphatic-aromatic hydrocarbon. Thus, examples of other suitable isocyanate compounds are 2,4-toluene diisocyanate and bis-(isocyanato phenyl) methane.

The coated lens is then subjected to conditions which cause the color coat to adhere to the lens, thereby entrapping the pigment within the binding polymer in a manner which forms a very stable, durable colored contact lens. After coating the lens, it may, for example, remain at ambient room temperature where most of the solvents are dried off. Typically, the lenses are then cured in a vacuum oven for about two hours at 90° C. Nitrogen gas may be used to purge the oven and to maintain an inert, reduced-pressure atmosphere. The above procedures can be varied such as to exclude the use of vacuum or nitrogen or to change oven temperatures and time. The suitability of any curing cycle is best determined by testing the adhesion of the coating to the lens as described later herein. Of course any conditions that bring about adhesion of the color coat may be used. Catalyst to speed the reaction of the isocyanate compound with the binder polymer may be added to the ink immediately prior to its being coated onto the lens. Such catalysts include tertiary amines, such as triethylamine, benzyl dimethylamine, dimethylcyclohexyl amine; and metallic catalysts such as stannous octoate and dibutyltin dilaurate. The above conditions are illustrative and not intended to limit the scope of the invention. Time and temperature can be optimized for any combination of materials.

The cured lenses are hydrated by methods commonly used for uncolored hydrophilic lenses.

The following table shows the desirable amounts of ingredients used to form inks in accordance with the invention.

| INGREDIENT | WEIGHT PERCENT OF COMPONENTS IN INK | |
|---|---|---|
| | BROAD RANGE | PREFERRED RANGE |
| Binding Polymer (including any residual unreacted monomer) | 10–40 | 13–25 |
| Isocyanate Compound Amount | Functional[1] | 0.5–10 |
| Opaque Color Substance (if opaque color is desired | Functional[1] Amount | 0.5–20 |
| Transparent Coloring Substance (if transparent color is desired | Functional[1] Amount | Functional[1] Amount |
| Polymerization[4] Initiator | 0–1.0 | 0–0.3 |
| Additional Monomers Amount | Functional[1] | 0–30 |
| Solvent[2] | q.s. ad 100%[3] | q.s. ad 100% |

[1]"Functional Amount" means the amount which an experimenter, skilled in the art, would use to achieve the desired result.
[2]Includes solvent from binding polymer solution and solvent used in pigment grinding.
[3]q.s. ad 100% means quantity required to produce 100%.
[4]Normally used only if the ink contains additional monomers.

The following examples are intended to illustrate, but not limit the invention. In the examples the following abbreviations are used.

HEMA is 2-hydroxyethyl methacrylate
EOEMA is 2-ethoxyethyl methacrylate
MAA is methacrylic acid
AIBN Is azobis (isobutyronitrile)
HDI is hexamethylene diisocyanate
VP is N-vinyl-2-pyrrolidone
MMA is methyl methacrylate
DAI is diallyl itaconate
IBA is isobutyl acrylate DEH is 2,5-dimethyl-2,5-bis(2-ethyl hexoyl peroxy) hexane
TBP is t-butyl peroxy benzoate

PREPARATIVE EXAMPLE NO. 1

Clear Contact Lens

| COMPONENT | WEIGHT FRACTION |
|---|---|
| VP | 0.7071 |
| MMA | 0.2625 |
| IBA | 0.0248 |
| DAI | 0.0016 |
| DEH | 0.0030 |
| TBP | 0.0010 |
| | 1.0000 |

Procedure

The ingredients were degassed at about 150 mmhg for about 15 minutes in a flask, then placed in a glass tube. The filled tube was capped and placed in a water bath for 72 hours at 20° C. and then for 96 hours at 30° C. The ingredients solidified during this time. The glass tube was removed from the water bath and subjected to the following treatment in an oven: 24 hrs. at 50° C., 4 hrs. at 70° C. and 24 hrs. at 110° C. The polymer was then removed from the glass tube and heated for 2 hrs. at b 1402° C. The polymer was formed into contact lenses by conventional methods as described, for example, in U.S. Pat. Nos. 4,158,089 and 4,182,802.

PREPARATIVE EXAMPLE NO. 2

Binding Polymer Solution

| COMPONENT | WEIGHT FRACTION |
|---|---|
| HEMA | 0.3743 |
| EOEMA | 0.0420 |
| MAA | 0.0087* |
| Cyclopentanone | 0.5695 |
| AIBN | 0.0021 |
| 2-Mercapto Ethanol | 0.0033 |
| Hydroquinone Monomethyl Ether | 0.0001 |
| | 1.0000 |

*0.0023 of this was in the HEMA supplied by its manufacturer. 0.0064 of this was added to the solution.

To produce the binding polymer solution charge all ingredients except hydroquinone monomethyl ether to a three neck flask. Place flask in 40° C. water bath and agitate slowly under nitrogen. Continue stirring until the viscosity is between 20,000 and 40,000 when measured on a Brookfield Viscometer with a #16 spindle at 3 RPM. Stop the polymerization by adding the hydroquinone monomethyl ether, remove the flask from the water bath and allow its contents to cool to room temperature.

PREPARATIVE EXAMPLE NO. 3

Ink

| COMPONENT | WEIGHT FRACTION |
|---|---|
| Binder Polymer Solution (from Preparative Ex. No. 2) | 0.5095 |
| Ethyl Lactate | 0.1635 |
| Phthalocyanine Blue | 0.0027 |
| Titanium Dioxide | 0.0558 |
| HEMA | 0.2136 |
| EOEMA | 0.0243 |
| MAA | 0.0050 |
| AIBN | 0.0012 |
| HDI | 0.0244 |
| | 1.000 |

Because this color coat is intended to be applied to the lenses by printing, it is referred to as an ink. However use of other types of color coats applied by other means is within the scope of the invention.

A paste is made by grinding the ethyl lactate, phthalocyanine blue (Pigment Blue 15, C.I. 74160) and titanium dioxide in a ball mill containing aluminum oxide ball media, for about 72 hours, until the particle size is less than 5 microns as measured on a Hegman grind gage. The paste is then mixed with the binding polymer solution. The ink is completed by mixing in the remaining ingredients just prior to use, so that the HDI is not excessively consumed prior to printing the ink on the lens.

PREPARATIVE EXAMPLE NO. 4

Clear Contact Lens

| COMPONENT | WEIGHT FRACTION |
|---|---|
| VP | 0.7056 |
| MMA | 0.2643 |
| IBA | 0.0249 |
| DAI | 0.0016 |
| DEH | 0.0030 |
| TBP | 0.0006 |
| | 1.0000 |

The polymerization and lens shaping procedure of PREPARATIVE EXAMPLE NO. 1 was repeated to yield a clear contact lens.

PREPARATIVE EXAMPLE NO. 5

Binding Polymer Solution

| COMPONENT | WEIGHT FRACTION |
|---|---|
| HEMA | 0.3776 |
| EOEMA | 0.0416 |
| MAA | 0.0064 |
| Cyclopentanone | 0.5699 |
| AIBN | 0.0022 |
| 2-Mercapto Ethanol | 0.0022 |
| Hydroquinone Monomethyl Ether | 0.0001 |
| | 1.0000 |

The procedure of PREPARATIVE EXAMPLE NO. 2 was followed and thereafter the resulting binding polymer solution was diluted with an equal weight of methanol and mixed. This mixture was added dropwise to ten times its weight of ethyl acetate to precipitate the polymer. The precipitated polymer was collected by vacuum filtration and dried over night in a vacuum oven. The dried binding polymer was then dissolved in sufficient cyclopentanone to produce a 43 weight percent solution of binding polymer, that is substantially free of unpolymerized monomer.

PREPARATIVE EXAMPLE NO. 6

Ink

| COMPONENT | WEIGHT FRACTION |
| --- | --- |
| Dried Binder Polymer in Cyclopentanone Solution (from Preparative Ex. No. 5) | 0.4922 |
| Ethyl Lactate | 0.1758 |
| Phthalocyanine Blue | 0.0029 |
| Titanium Dioxide | 0.0601 |
| Bis(2-methoxyethyl)ether* | 0.2445 |
| HDI | 0.0245 |
| | 1.0000 |

*This solvent, which is free of functional groups reactive with HDI, was used to adjust the application properties of the ink.

The grinding and mixing procedure of PREPARATIVE EXAMPLE 3 was repeated to yield an ink that is believed to be free of unpolymerized monomer.

EXAMPLES IN ACCORDANCE WITH THE INVENTION

Example 1

A colored contact lens was prepared using the lens of Preparative Example No. 1, which is a hydrophilic polymer devoid of the groups —OH, —COOH, —NH—R, —NCO, and epoxy (wherein R is as previously defined) and the ink of Preparative Example No. 3 which contains HDI and a binding polymer having the groups —OH and —COOH.

Colored Lens Preparation

Unhydrated lenses were printed with an annular pattern by the procedure described in U.S. Pat. No. 4,582,402 (Knapp). Briefly a gravure metal plate having etched depressions in the annular pattern is inked. The excess ink is removed by a doctor blade. A flexible pad is passed against the plate to transfer ink from the depressions in the plate to the pad.

The pad, now carrying the inked annular pattern is pressed against the lens surface to complete the printing. The printed lenses are stored for a time at room temperature and thereafter placed in an oven. The oven is purged three times by alternately pulling 500 mm of water vacuum followed by filling to 130 mm of water vacuum with nitrogen. All valves to the oven are then closed and the temperature is raised to about 90° C. and maintained for about two hours.

The printed lenses are hydrated for 2 hrs. at about 98° C. immersed in a 0.9% by weight, borate-buffered saline solution at pH of about 8.

Adhesion Testing Procedure

The hydrated lens is mounted 4" from an air brush connected to a methanol reservoir. The printed side of the lens is sprayed for 30 seconds with methanol pressured at 40 psig with nitrogen. The lens is then placed in pH 8, 0.9% saline solution for 2 to 3 minutes.

The lens is considered to fail the adhesion test if any coating comes off during the last saline-solution treatment or at any other time during the test. If no coating is so removed, the lens is considered to pass the test.

Results

Five out of five lenses passed the adhesion test.

Example 2

The procedure of Example 1 was repeated using the lens of PREPARATIVE EXAMPLE NO. 4 and the ink of PREPARATIVE EXAMPLE NO. 6. All 5 lenses passed the adhesion test. This example proves that the color coat need not contain unpolymerized monomer.

The above Examples are in accordance with the invention. The lens polymers are hydrophilic and devoid of the functional groups —COOH, —OH, —NH—R, —NCO, and epoxy. In addition to pigment, the color coat comprises a binding polymer having functional groups selected from at least one of —COOH, —OH, and —NH—R, and an additional compound having at least two groups per molecule of —NCO.

In view of the teaching of Loshaek's U.S. Pat. No. 4,668,240, it is very surprising that the lenses produced by the above example passed the adhesion test. The Loshaek Patent teaches that, for the binding polymer and additional compound used in the ink of this example, the lens polymer must have functional groups —OH, —COOH, or —NH—R, or the functional groups —NCO or epoxy. Yet satisfactory ink adhesion to a hydrophilic lens was achieved without these functional groups previously believed necessary.

COMPARATIVE EXAMPLE

Example 1 (and Preparative Examples 1, 2, and 3) were repeated except that no HDI was added to the ink. All 5 lenses failed the adhesion test.

While the invention has been illustrated in terms of its preferred embodiment, it is intended that the invention cover all other embodiments encompassed by the appended claims.

What is claimed is:

1. A method for making a colored hydrophilic contact lens comprising the steps of:
    (a) providing a contact lens constructed of hydrophilic polymer having been produced by copolymerizing from about 50 to about 90 weight percent of a hydrophilic vinyl heterocyclic nitrogen containing monomer that is substantially devoid of the functional groups —COOH, —OH, —NH—R wherein R is hydrogen or $C_1$ to $C_8$ alkyl, —NCO and epoxy,
    (b) coating at least a portion of a surface of the lens with a color coat comprising at least one pigment, binding polymer having functional groups selected from at least one of —COOH, —OH, and —NH—R, wherein R is hydrogen or $C_1$ to $C_8$ alkyl, and an additional compound having at least two groups per molecule of —NCO, and
    (c) subjecting the coated lens to conditions which cause the color coat to adhere to the lens.

2. The method of claim 1 wherein the additional compound in the color coat contains two isocyanate groups.

3. The method of claim 2 wherein the additional compound is selected from hexamethylene diisocyanate, 2,4-toluene diisocyanate, and bis(isocyanato phenyl) methane.

4. The method of any one of claims 1 to 3 wherein the lens polymer is formed from monomers comprising at least one monomer selected from N-vinyl pyrrolidone, N-vinyl succinimide, N-vinyl-ε-caprolactam, vinyl pyridine and N-vinyl glutarimide.

5. The method of claim 4 wherein the lens polymer is formed from monomers comprising N-vinyl pyrrolidone.

6. The method of claim 1 wherein the lens polymer is formed from monomers comprising from about 60 to about 80 weight percent N-vinyl pyrrolidone.

7. The method of claim 6 wherein the lens polymer is formed from monomers comprising from about 65 to about 75 weight percent N-vinyl pyrrolidone.

8. The method of claim 4 wherein the binding polymer is formed from monomer comprising at least one monomer selected from acrylic acid, methacrylic acid, hydroxy $C_1$ to $C_6$ alkyl ester of acrylic and methacrylic acid, amino-$C_1$ to $C_6$ alkyl ester of acrylic and methacrylic acid and glycerol esters of acrylic and methacrylic acid.

9. The method of claim 8 wherein the lens polymer is formed from monomers comprising N-vinyl pyrrolidone.

10. The method of claim 8 wherein the binding polymer is formed from monomer comprising 75 to 100 weight percent hydroxy straight or branched chain $C_2$ to $C_4$ alkyl monoester of acrylic or methyacrylic acid, 0 to 20 weight percent $C_2$-$C_4$ alkoxy $C_2$-$C_4$ alkyl ester of acrylic or methacrylic acid and 0 to 4 weight percent acrylic or methacrylic acid.

11. The method of claim 10 wherein the lens polymer is formed from monomers comprising N-vinyl pyrrolidone.

12. The method of claim 10 wherein the binding polymer is formed from monomer comprising 75 to 100 weight percent hydroxyethyl methacrylate, 0 to 20 weight percent ethoxyethyl methacrylate, and 0 to 4 weight percent methacrylic acid.

13. The method of claim 12 wherein the lens polymer is formed from monomers comprising N-vinyl pyrrolidone.

14. A lens made by the method of claim 1.
15. A lens made by the method of claim 2.
16. A lens made by the method of claim 3.
17. A lens made by the method of claim 4.
18. A lens made by the method of claim 5.
19. A lens made by the method of claim 6.
20. A lens made by the method of claim 7.
21. A lens made by the method of claim 8.
22. A lens made by the method of claim 9.
23. A lens made by the method of claim 10.
24. A lens made by the method of claim 11.
25. A lens made by the method of claim 12.
26. A lens made by the method of claim 13.

* * * * *